United States Patent [19]

Gellert

[11] 4,286,941
[45] Sep. 1, 1981

[54] INJECTION MOLDING NOZZLE SEAL

[76] Inventor: Jobst U. Gellert, 7A Prince St., Glen Williams, Ontario, Canada

[21] Appl. No.: 173,084

[22] Filed: Jul. 28, 1980

[30] Foreign Application Priority Data

Jul. 15, 1980 [CA] Canada .................................. 356233

[51] Int. Cl.³ ............................ B29F 1/03; B29F 1/05
[52] U.S. Cl. .................................................. 425/566
[58] Field of Search ....................... 425/564, 566, 571

[56] References Cited

U.S. PATENT DOCUMENTS

| | | | |
|---|---|---|---|
| 4,043,740 | 8/1977 | Gellert | 425/566 X |
| 4,212,627 | 7/1980 | Gellert | 425/564 |

FOREIGN PATENT DOCUMENTS 50-67361 of 1975 Japan .

*Primary Examiner*—Thomas P. Pavelko
*Attorney, Agent, or Firm*—Riches, McKenzie & Herbert

[57] ABSTRACT

This invention relates to a nozzle seal for valve-gated injection molding. The hollow seal is seated in the nozzle portion of the heater cast and extends across the insulative air gap and into a gate aperture in the cavity plate. The inner bore of the nozzle seal is tapered to form the gate which receives the tip end of the valve pin in the closed position. The nozzle seal is formed of a poor conductive metal such as titanium alloy which conducts sufficient heat to provide a clean closing gate without resulting in unacceptable heat loss to the surrounding cavity plate.

3 Claims, 4 Drawing Figures

INJECTION MOLDING NOZZLE SEAL

BACKGROUND OF THE INVENTION

This invention relates to valve-gated injection molding systems and more particularly to an improved nozzle seal extending across the air space from the heater cast to form the gate.

As shown in the applicant's U.S. Pat. No. 4,043,740 which issued Aug. 23, 1977, it is known to provide a nozzle seal which is seated in the nozzle portion of the heater cast and extends across the air space to abut on the cavity plate around the gate. While this does prevent the escape of pressurized melt into the air space and does increase heat transfer to the gate area, there are remaining problems which are not overcome when certain materials are used for certain applications. Normally, the valve pin is not closed for 3-4 seconds after the cavity is filled to allow for shrinkage. However, during this period a thin layer or film of melt solidifies on the inside of the gate and then when the valve pin is closed, is applied considerable pressure to this solidified material. This results in certain materials such as polyester crystalizing when the pressure is applied. During the next cycle when the valve pin is opened, this crystalline material passes through the gate into the cavity which produces flaws in the molded product. This is particularly unsatisfactory when molding polyethylene terephthalate thermoplastic polyester preforms to be blow molded into bottles because the crystalline material which is formed is milky and cannot be blown. Another remaining problem with the previous system is that a bubble may be formed on the product when the mold is opened and the product is pulled away from the gate.

While it is known to provide externally heated heater casts or nozzles which extend directly to the cavity through a gate aperture in the cavity plate, this arrangement has the disadvantage of resulting in excessive heat loss through the direct contact between the cooled cavity plate and the heated nozzle which must be formed of a relatively conductive material.

In order to overcome these problems, it is necessary to provide for the transfer of heat right into the gate area adjacent the cavity. However, this must be done without reducing the effective cooling of the adjacent portions of the cavity plate. As will be appreciated, the more heat that is conducted to the area, the more important the effectiveness of the cooling becomes. Otherwise, the product will not set quickly enough to provide efficient operation of the system.

SUMMARY OF THE INVENTION

Accordingly, it is an object of the present invention to at least partially overcome these disadvantages by providing a nozzle seal which is a separate component from the heater cast and which extends into the cavity plate to form the gate.

To this end, in one of its aspects, the invention provides a valve-gated injection molding system comprising a heated heater cast seated in a cooled cavity plate, the heater cast having a nozzle portion which is separated from the cavity plate by an air space, a gate through the cavity plate leading to a cavity, a melt passage extending through the heater cast for conveying pressurized melt from a molding machine to the gate, an elongated valve pin to reciprocate in a bore in the heater cast between open and closed positions, the valve pin having a driven end and a tip end, and valve pin actuating mechanism, the improvement wherein a hollow nozzle seal having a central bore extends across the air space between the heater cast and the cavity plate with its bore coaxial with the bore of the heater cast and the gate, the nozzle seal having a first end portion received in the nozzle portion of the heater cast and a second end portion which extends into a gate aperture through the cavity plate, whereby the second end portion of the nozzle seal forms the gate which receives the tip end of the valve pin in the closed position.

Further objects and advantages of the invention will appear from the following description, taken together with the accompanying drawings.

DESCRIPTION OF THE PREFERRED EMBODIMENTS

Figure 1:
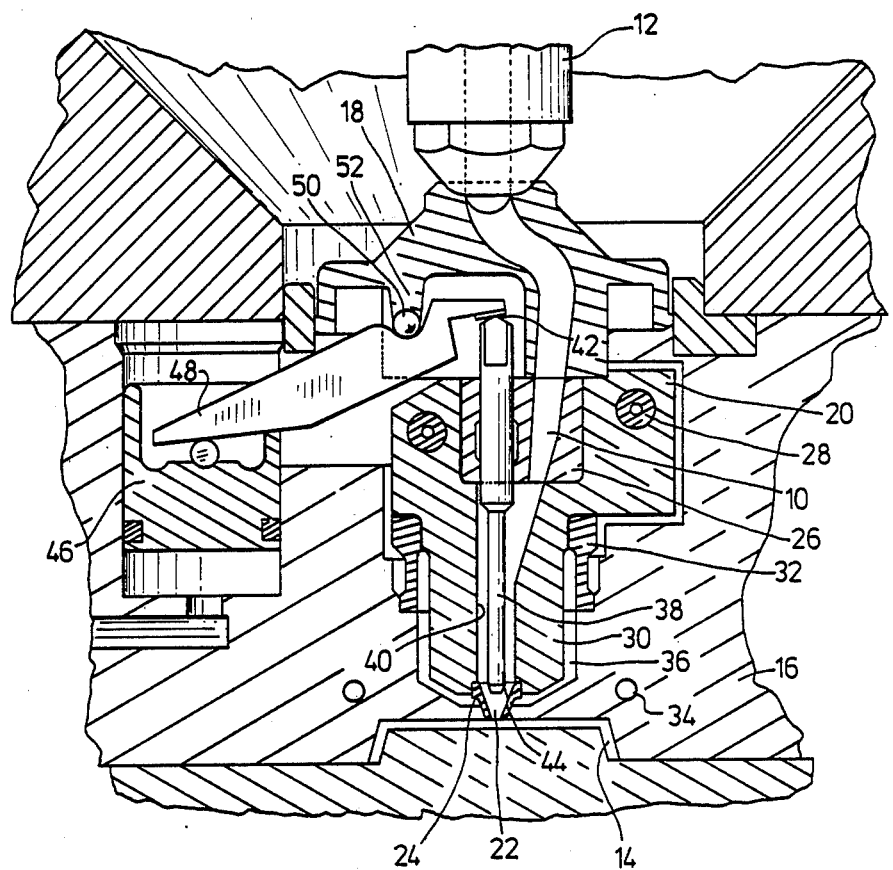
FIG. 1 is a sectional view of a valve-gated injection molding system according to a preferred embodiment of the invention.

Reference is first made to FIG. 1 which shows a valve-gated injection molding system having a melt passage 10 through which pressurized melt flows from a molding machine 12 to a cavity 14 in a cavity plate 16. The melt passage 10 extents through a back plate 18 a heater cast 20, from which the melt flows through a gate 22 formed by the nozzle seal 24 and into the cavity 14. The melt passage 10 also extends through a bushing seal 26 which is seated in the heater cast 20 and abuts against the back plate 18. The heater cast 20 is heated by electrical heating element 28 which is cast into it and has a nozzle portion 30 which is securely mounted in the cavity plate 16 by an insulation bushing 32. The cavity plate 16 is cooled by cooling elements 34 and an air space 36 is provided to insulate the cooled cavity plate 16 from the heated heater cast 20.

A valve pin 38 is located in a generally cylindrical bore 40 in the heater cast 20. It has a peaked driven end 42 and a tip end 44 which is shaped to be seated in the gate 22 formed by the nozzle seal 24. Valve pin actuating mechanism includes an air operated piston 46 and a rocker arm 48 which pivots on a pivot ball 50 fixed to the end of a pivot pin portion 52 of the back plate 18 as may be seen, after extending through the bushing seal 26, the melt passage 10 joins the cylindrical bore 40 in the heater cast 20, and the melt then flows around the valve pin 38, but is heated from the outside.

Figure 3:
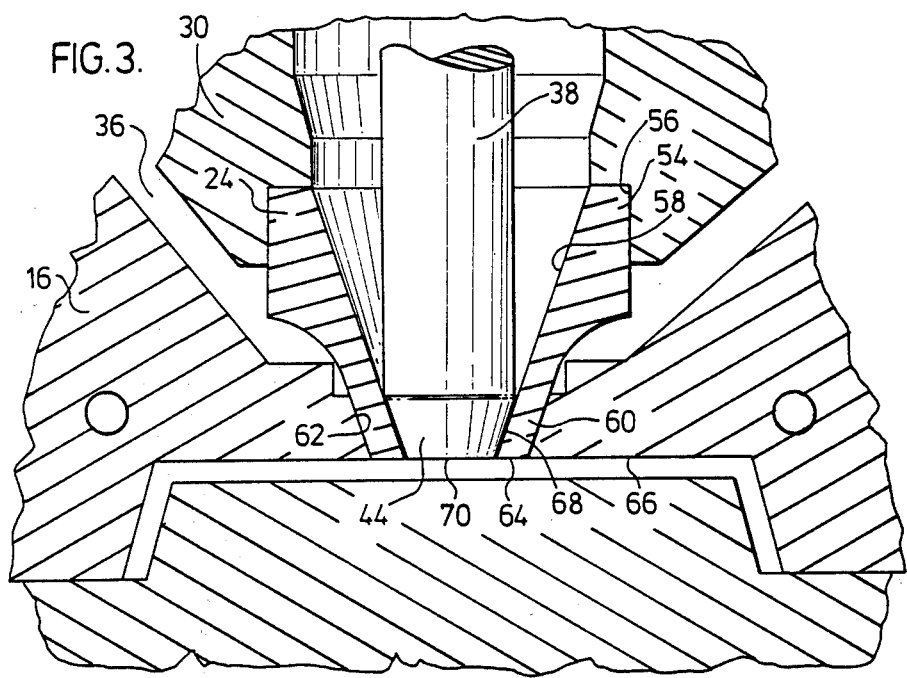
FIG. 3 is an enlarged sectional view shown in the nozzle seal shown in FIG. 1.

As more clearly seen in FIG. 3, the nozzle seal 24 is hollow and has a first end portion 54 which is securely seated in a cylindrical recess 56 in the nozzle portion 30 of the heated cast 20 with the inner bore 58 of the nozzle seal 24 in alignment with the cylindrical bore 40 of the heater cast 20. The nozzle seal 24 also has a tapered second end portion 60 which is securely seated in a matching gate aperture 62 which extends through the cavity plate 16 to the cavity 14. The nozzle seal 24 is formed of a titanium alloy and is dimensioned such that it expands and is brought into bearing contact with the cavity plate 16 when heated to operating temperature.

This prevents the escape of the pressurized melt into the air space 36, but avoids direct contact between the heated heater cast 20 and the cooled cavity plate 16. In this embodiment the end surface 64 is flat and is substantially in alignment with the cavity wall 66 under operating conditions. The inner bore 58 of the nozzle seal 24 is tapered to form the gate 22 and the outer surface 68 of the tip end 44 of the valve pin 38 is similarly tapered to be seated in the gate 22 in the closed position with its end surface 70 also substantially in alignment with the cavity wall 66.

In use, the valve pin 38 operates in a conventional manner to open and close the gate 22. Air pressure operates piston 46 which pivots rocker arm 48 to drive the valve pin 38 to the closed position with its tip end 44 seated in the gate 22. When the air pressure is released and the melt pressure reapplied after ejection, the melt pressure shifts the valve pin 38 to the open position. In the open position, hot pressurized melt from the molding machine 12 flows through the melt passage 10, through the gate 22 and into the cavity 14. After holding pressure for a few seconds to allow for "packing" and to prevent shrinkage, the valve is then closed, the product is cooled down to be ejected, and the process is repeated.

Figure 2:
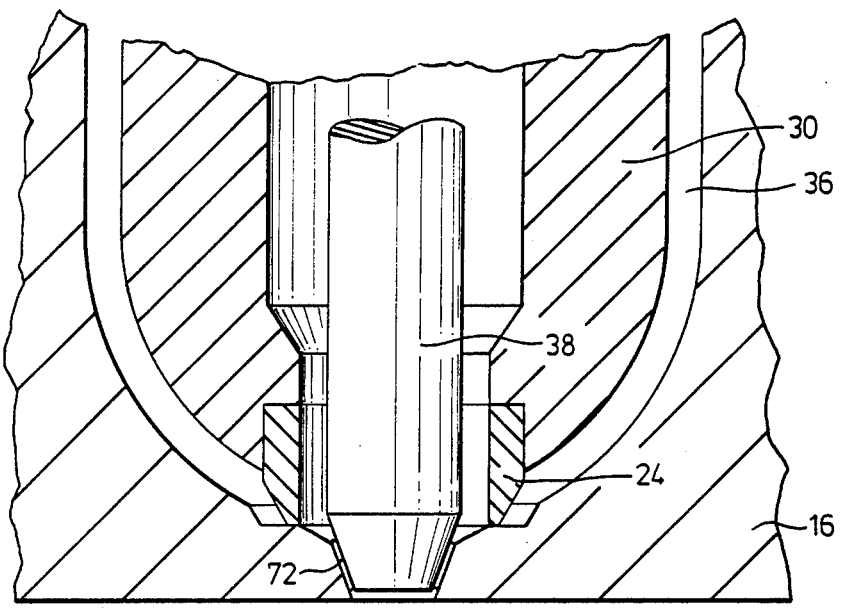
FIG. 2 is a partial sectional view of a prior art nozzle seal.

FIG. 2 shows a previous nozzle seal as disclosed in the applicant's above mentioned U.S. Pat. No. 4,043,740 which issued Aug. 23, 1977. This nozzle seal abuts on the cavity plate around the gate which does not provide sufficient heat to avoid a film or layer of melt 72 forming on the inside surface of the gate in the cavity plate in some applications. When the valve pin closes, as shown, this layer of melt 72 is pressurized which crystalizes it with the unsatisfactory results discussed above. In the present invention, this is avoided by extending the nozzle seal 24 into a gate aperture 62 in the cavity plate 16 whereby the gate 22 is formed in the nozzle seal 24 rather than in the cavity plate 16. The nozzle seal 24 is formed of a poor conductive metal which, depending upon the type of material being molded, conducts sufficient heat to the gate area without resulting in excessive heat loss through the nozzle seal 24 to the cavity plate 16. The cavity plate 16 thus retains the effectiveness of its cooling which becomes even more important to the successful operation of the system as a result of the provision for heat transfer right around the gate.

Figure 4:
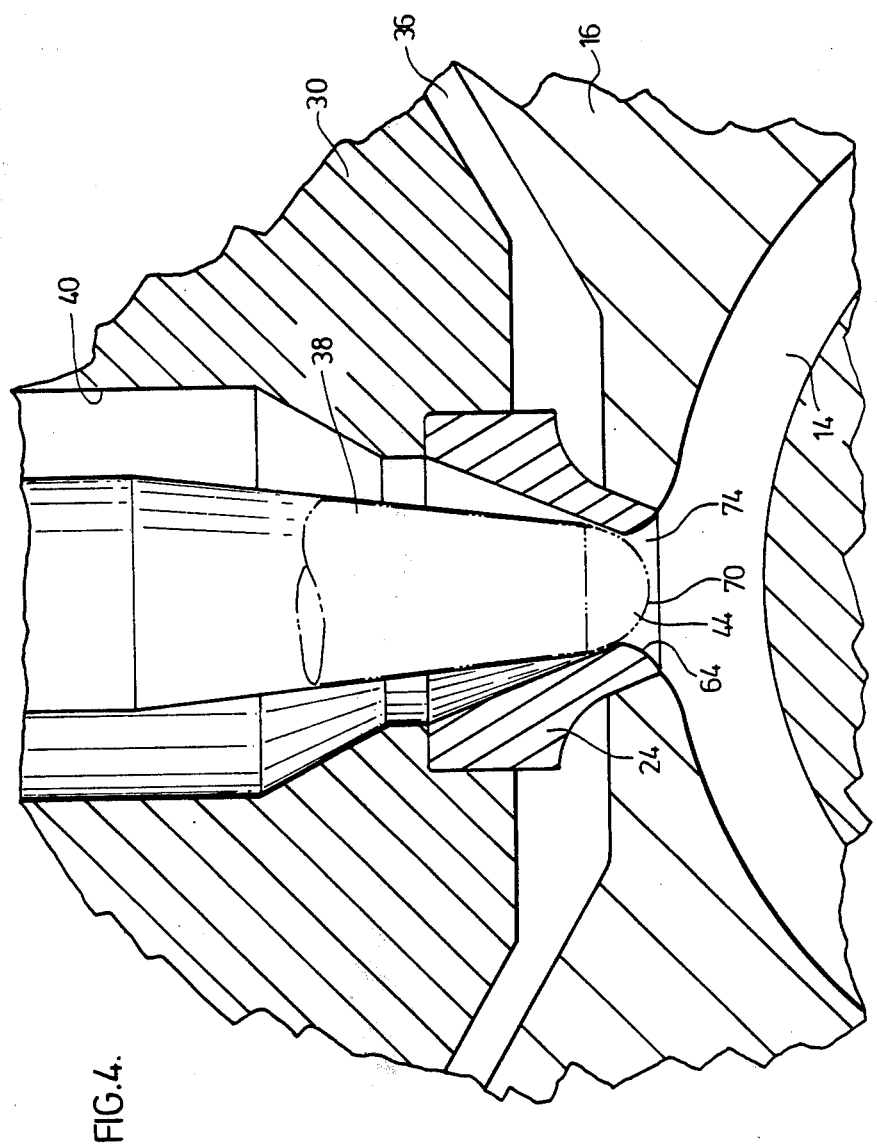
FIG. 4 is a similar view showing a nozzle seal according to another embodiment of the invention.

Referring now to FIG. 4, it partially shows a valve-gated injection molding system having a nozzle seal according to another embodiment of the invention. As many of the features are identical to those of the first embodiment, features common to both embodiments are described and illustrated using the same reference numerals. In this embodiment, the end surface 70 of the tip end 44 of the valve pin 38 is rounded and the end surface 64 of the nozzle seal 24 is curved inwardly upward to leave a space 74 which is filled with melt when the valve pin 38 closes. While this arrangement will produce a gate mark, it may be used when molding products where this is not an important factor, such as in making preforms to be flow molded into bottles. The operation of this embodiment of the invention is essentially the same as that described above and need not be repeated.

Although the description of this invention has been given with respect to two particular embodiments, it is not to be construed in a limiting sense. Variations and modifications will now occur to those skilled in the in the art. In particular, the nozzle seal 24 could have other shapes and be formed of other materials while still forming the gate and providing the necessary heat transfer characteristics. For a defininion of the invention, reference is made to the appended claims.

What I claim is:

1. In a valve-gated injection molding system comprising a heated heater cast seated in a cooled cavity plate, the heater cast having a nozzle portion which is separated from the cavity plate by an air space, a gate through the cavity plate leading to a cavity, a melt passage extending through the heater cast for conveying pressurized melt from a molding machine to the gate, an elongated valve pin to reciprocate in a bore in the heater cast between open and closed positions, the valve pin having a driven end and a tip end, and valve pin actuating mechanism, the improvement wherein a hollow nozzle seal having a central bore extends across the air space between the heater cast and the cavity plate with its bore coaxial with the bore of the heater cast and the gate, the nozzle seal having a first end portion received in the nozzle portion of the heater cast and a second end portion which extends into a gate aperture through the cavity plate, whereby the second end portion of the nozzle seal forms the gate which receives the tip end of the valve pin in the closed position.

2. A system as claimed in claim 1 wherein the second end portion of the nozzle seal extends through the gate aperture in the cavity plate substantially to the cavity.

3. A system as claimed in claim 1 wherein the nozzle seal is formed of a titanium alloy.

* * * * *